United States Patent Office 2,764,328
Patented Sept. 25, 1956

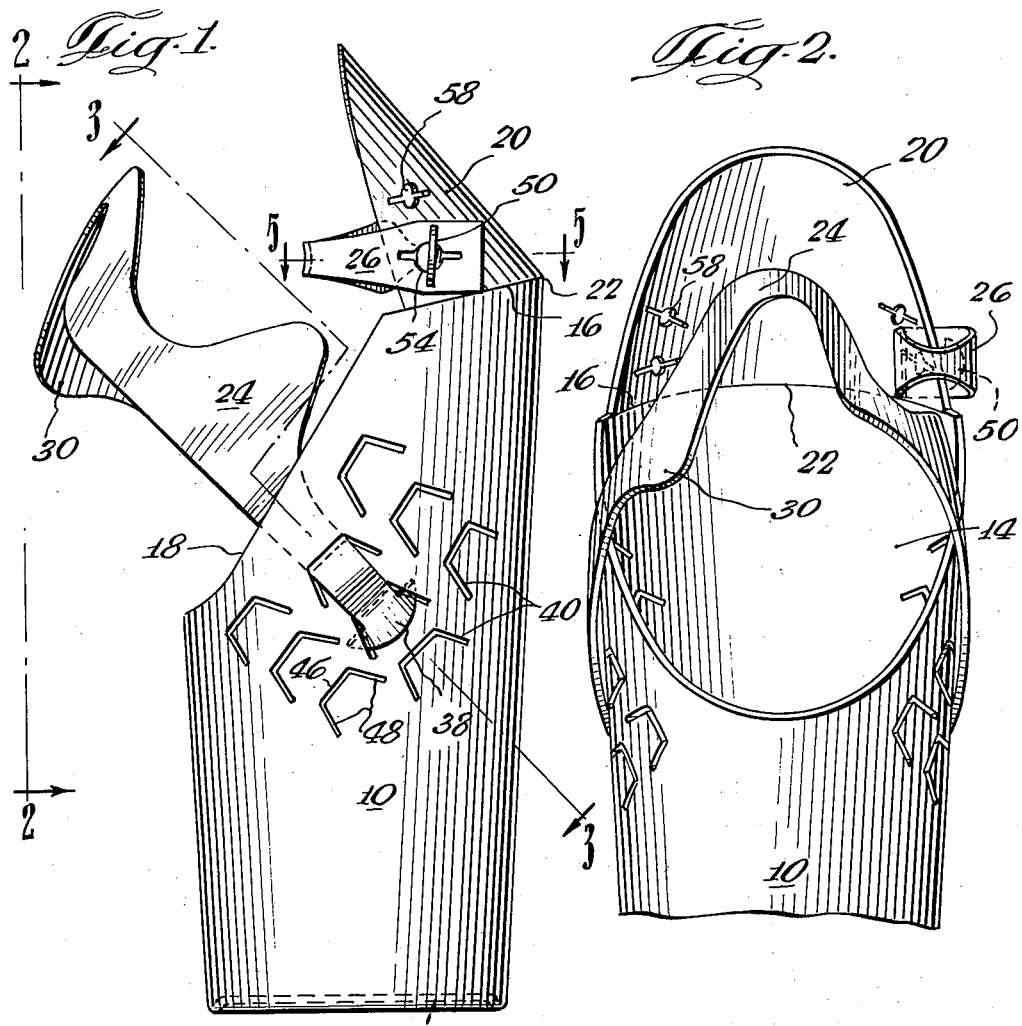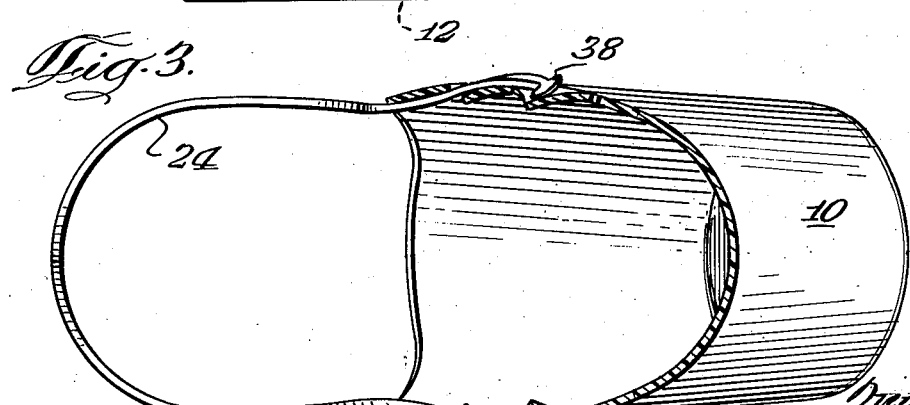

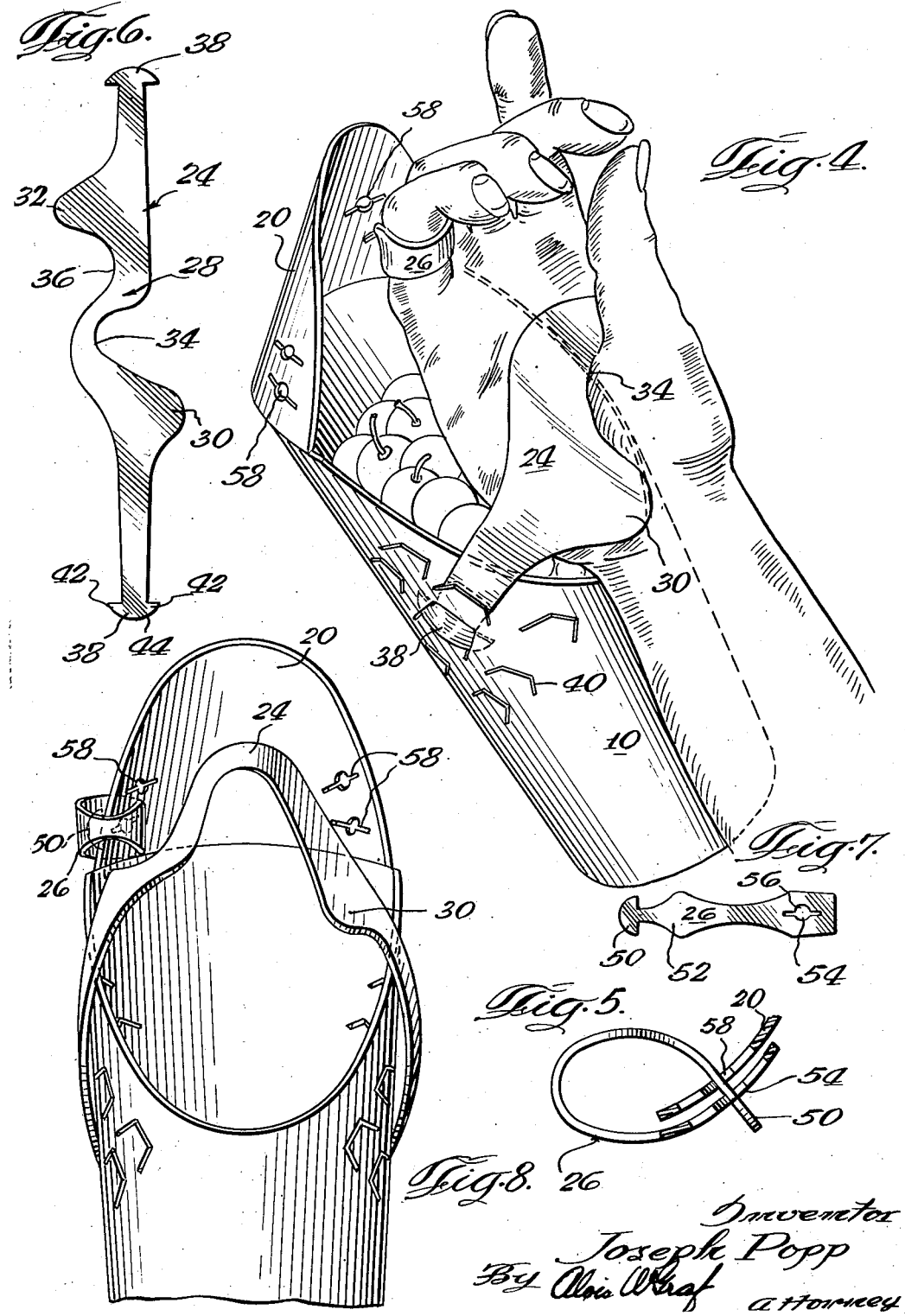

2,764,328

HARVESTING CONTAINER

Joseph Popp, Hobart, Ind.

Application June 16, 1954, Serial No. 437,225

3 Claims. (Cl. 224—28)

The present invention relates to containers for the harvesting of produce, particularly produce of the fruit variety.

Many types of produce must either be harvested manually, or are most economically harvested in this manner. Customarily, a worker engaged in harvesting such produce is equipped with a container which is either attached to his person, usually at his waist, or is carried with him as he moves from plant to plant harvesting the product.

In harvesting certain berry products, it is customary for the worker to hold the container in one hand while picking the berries with his other hand, so that the berries may be dropped directly into the container. Harvesting produce in this manner is a slow, burdensome process which results in a relatively high priced product. Further, due to the fact that the harvester is required to transport the product a relatively long distance from the plant to the container in which the product is to be deposited, an undesirable portion of the plant is often inadvertently removed in the picking process in an effort to speed up the work. In addition, some plants are provided with thorns, or other sharp projections, and the harvester is continuously running the risk of injuring his hands upon the plants.

Gloves are often worn to reduce this risk. However, the use of gloves inevitably impairs the facility with which the harvester may pick the produce.

It is an object of the present invention to provide a container which may be worn by a harvester adjacent to his fingers.

It is a further object of the present invention to provide a container which may be attached upon the hands of the harvester in order to avoid the disadvantages of the manual harvesting systems presently in use.

It is also an object of the present invention to provide a container adapted to be disposed adjacent to the hands of a harvester which protects the hands of the harvester.

Novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings, in which:

Figure 1 is an elevational view of a harvesting container embodying the teachings of the present invention;

Figure 2 is a rear elevational view of the harvesting container illustrated in Figure 1;

Figure 3 is a sectional view taken along line 3—3 of Figure 1;

Figure 4 is an isometric view of the harvesting container as attached upon a human right hand;

Figure 5 is a sectional view of the strap for attaching the container to a finger of the harvester taken along line 5—5 of Figure 1;

Figure 6 is a plan view of the strap which attaches the harvesting container to the palm of a human hand;

Figure 7 is a plan view of the finger strap clearly illustrated in Figure 5; and Figure 8 is a rear elevational view of the harvesting container with the hand strap and finger strap positioned for left hand use.

The harvesting container has a body 10 which is elongated and has a generally round cross section. The body 10 is slightly conical and tapers to a bottom 12 sealed thereto at one end. The other end of the body 10 is open forming an aperture 14 which lies generally upon a plane disposed at an angle of approximately 45 degrees relative to the axis of the body. In the particular embodiment illustrated, the aperture 14 is formed by two intersecting planes whose combined angle is approximately 45 degrees relative to the axis of the body 10. The edge 16 of the body 10 which is farthest from the bottom 12 is formed by the plane more nearly perpendicular to the axis of the body 10 than is the intersecting plane which forms the rim 18 of the aperture 14.

A shield 20 is secured to the edge 16 of the body 10 and is arcuate in shape. The shield 20 has two functions. It guides the produce into the body 10 of the harvesting container after it has been picked, and it protects the fingers of the harvester from scratches on the plants that are being harvested. Due to the fact that the edge 16 of the aperture 14 is disposed at an angle with respect to the axis of the body 10, the central point 22 on the edge 16 is at the farthest distance on the body 10 from the bottom 12. The point 22 is also centrally disposed with respect to the shield 20. It has been found that the shield 20 produces best results when disposed at an angle of approximately 45 degrees with respect to the axis of elongation of the body 10.

As best illustrated in Figure 4, the harvesting container is attached to a human hand by means of a hand strap 24 and a finger strap 26. The hand strap 24 is attached to the body 10 of the harvesting container and is adapted to fit between the thumb and index finger of the human hand when used with the harvesting container. The finger strap 26 is attached to the periphery of the shield 20 and is in the form of a loop which is disposed about the little finger of the human hand when associated with the harvesting container. The hand strap is illustrated in Figure 6, and is provided with a central portion 28 which is generally shaped in the form of the letter S. The S shaped central portion 28 is formed by a pair of spaced curvilinear projections 30 and 32 disposed upon opposite sides of the hand strap 24 and two curvilinear indentations 34 and 36 disposed between the projections 30 and 32. When used in association with the right hand of a human being, the indentation 34 accommodates the thumb of the human being while the projection 30 protects the palm of the human being from thorns and the like on the plant being harvested. The indentation 36 is then disposed adjacent to the index finger, and the projection 32 is disposed adjacent to the back of the hand and protects the back of the hand from scratches. For use on the left hand of a human being, the hand strap 24 is inverted, and thereafter the projections and indentations aligned with the hand in the same manner, as may be visualized from Figure 8. The hand strap 24 is attached to the body 10 of the harvesting container essentially normal to the plane of the aperture 14.

Since the size of human hands differ, it is desirable to have the strap adjustable. For this reason, each end of the hand strap 24 is provided with barbs 38 which are removably positioned in slots 40 in the body 10 of the harvesting container. The barbs 38 are formed by a pair of outwardly extending shoulders 42 which are essentially normal to the axis of the hand strap 24 and which are interconnected by a rounded end 44 of the hand strap 24. The slots 40 have three portions. The slots 40 have a central portion 46 slightly greater than the distance between the shoulders 42 of the barbs 38 of the hand strap 24. These central portions 46 are disposed generally parallel to the plane of the aperture 14. End portions 48 are contiguous to the central portion 46 of each slot 40 and flare outwardly therefrom. The end portions 48 terminate at a distance from each other slightly greater than the maximum distance across the shoulders 42 of the barbs 38. There are three rows of 3 slots each disposed upon opposite sides of the aperture 14 in the body 10. Within each row, the slots 40 are spaced by a distance of approximately 1 inch, and the rows are spaced from each other and generally parallel with respect to each other. The hand strap 24 may be inserted into any one of the slots 40 in any one of the rows, however, both ends of the hand strap 24 are preferably disposed within a slot 40 in the same row for the normal human hand. Each of the barbs ends 38 of the hand strap 24 is inserted into one of the slots 40, generally from the outside of the body 10, as illustrated in Figures 2, 4, and 8, although it may be inserted from the inside of the body 10 as illustrated in Figures 1 and 3.

The finger strap 26 is illustrated in detail in Figures 5 and 7. It is of sufficient length to loop about the little finger of a human hand, and is provided with a barb 50 at one end identical in construction to the barbs 38 at the ends of the hand strap 24. The finger strap 26 has an outwardly flaring portion 52 adjacent to the barb 50 and spaced therefrom. A finger strap 26 is also provided with a slot 54 at the end thereof opposite to the barb 50 which is provided with a circular central portion 56. The slot 54 is disposed along the axis of the finger strap 26 and is slightly longer than the widest portion of the barb 50. As illustrated in Figure 5, the barb 50 of the finger strap 26 is inserted into the slot 54 by twisting the finger strap 26 through an angle of approximately 90 degrees. The diameter of the center portion 56 of the slot 54 is slightly larger than the relatively narrow portion of the finger strap 26 between the barb 50 and the flaring portion 52 to permit the finger strap 26 to resume its untwisted orientation, thereby securing the barb 50 within the slot 54. The shield 20 is provided with a pair of slots 58 on each side thereof adjacent to the periphery thereof and adjacent to the aperture 14 in the body 10. The slots 58 are identical to the slot 54 in the finger strap 26 and are oriented parallel to the plane of the aperture 14 in the body 10. The finger strap 26 may be disposed within the slots 58 on either side of the center point 22 of the shield 20, depending upon whether the harvesting container is to be used on the human left or right hand. If it is to be used on the right human hand, as illustrated in Figure 4, the finger strap 26 is placed within one of the two slots 58 to the right of the center point 22 as viewed by the person using the harvesting container. However, if used by a left handed person, the two slots 58 at the left are used. In this manner, a single harvesting container may be adapted for use on either the right or the left hand. Further, the span of the hand will determine which of the three rows of the slots 40 in the body are to be used to secure the barbs 38 of the hand strap 24, since the span of the hand determines the distance between the little finger and the thumb.

It is clear that a single person may use two harvesting containers at the same time, one on each hand. The fruit or other produce is then harvested by picking it in the conventional manner, that is, grasping it between the thumb and index or second finger to remove the fruit or other produce from the plant. The produce is then dropped into the body 10 of the container, either directly or by permitting gravity to slide the produce across the palm of the hand.

It has been found that transparent plastics, such as polyethylene, are particularly satisfactory for the body, and shield of the harvesting container, because they permit the harvester to see the amount of produce in the body at any one time. Polyethylene is also suitable for the hand and finger straps, since it is a tough durable and flexible material.

It is clear that the harvesting container may be used for virtually all types of berries, cherries, coffee, and many other items of produce. It is also clear that the harvester may efficiently harvest products which are at the extremity of his reach, since he need not continuously move his arms to deposit the harvested product in the container. This advantage both reduces the fatigue of harvesting and speeds up the harvesting process. In addition, the harvester's hands are protected by the hand strap and shield, the hand strap protecting both the palm and the back of the hand.

The man skilled in the art will readily devise many other uses and modifications for the invention described herein. It is therefore intended that the scope of the present invention be not limited by the specific embodiment herein described, but rather only by the appended claims.

What is claimed is:

1. A harvesting container adapted for use on either hand of a human being comprising an elongated hollow body having an essentially round cross section open at one end and closed at the other end, the open end of said body forming an aperture angularly disposed relative to the axis of the body, a shield attached to the body at the periphery of the portion of the aperture farthest from the closed end of the body, said shield extending toward the axis of the body, a hand strap having ends attached to the body on opposite sides of the aperture and extending across the aperture, said hand strap being adapted to be disposed between the thumb and index finger of either human hand, and a finger strap attached adjacent to the periphery of the shield contiguous to the body, said finger strap being in the form of a loop and being adapted to fit about the little finger of the human hand when disposed in the hand strap and finger strap, whereby the aperture in the body is adapted to be disposed directly below the fingers of the human hand, said hand strap being provided with a pair of spaced curvilinear protrusions centrally thereof on opposite sides of the strap, said strap also being provided with a pair of curvilinear indentations between said protrusions, an indentation being disposed adjacent to each protrusion, whereby the strap is adapted to fit around a human hand with the protrusions disposed over the palm and back of the hand.

2. A harvesting container adapted for use on either hand of a human being comprising an elongated hollow body having an essentially round cross section open at one end and closed at the other end, the open end of said body forming an aperture angularly disposed relative to the axis of the body, a shield attached to the body at the periphery of the portion of the aperture farthest from the closed end of the body, said shield extending toward the axis of the body, a hand strap having ends attached to the body on opposite sides of the aperture and extending across the aperture, said hand strap being adapted to be disposed between the thumb and index finger of either human hand, and a finger strap attached adjacent to the periphery of the shield contiguous to the body, said finger strap being in the form of a loop and being adapted to fit about the little finger of the human hand when disposed in the hand strap and finger strap, whereby the aperture in the body is adapted to be disposed directly below the fingers of the human hand, the finger strap being provided with an axial slot adjacent to one end having a rounded central portion, and a barb at the other end, said barb having a pair of outwardly extending shoulders on opposite sides of the finger strap, the maximum distance across the shoulders of the barb being no greater than the length of the slot at the other end of the finger strap and the distance across the strap adjacent to the shoulders being no greater than the diameter of the rounded portion of the slot, the shield being provided adjacent each edge in the proximity of the body with a slot similar to the slot in the finger strap, and the barb extending through the slot in the shield and being disposed in the slot in the finger strap forming a loop for the little finger of a human hand.

3. A harvesting container adapted for use on either hand of a human being comprising an elongated hollow container having a closed end and an open end angularly disposed relative to the axis of the body, a shield attached to the body at a portion of said open end at the periphery farthest from the closed end and extending toward the axis of the body, a reversible removable adjustable curvilinear hand strap formed to fit between the thumb and index finger of either human hand, said hand strap having protrusions and indentations along the edges thereof, said body having a plurality of groups of slots adjacent opposite sides of the aperture for adjustably receiving the ends of the hand strap to extend across said aperture, the ends of said hand strap being provided with barbs for engaging said slots of said body to retain said strap in adjusted position, and an adjustably positioned removable little finger strap having a slot adjacent one end and a barb at the other end for engaging said slot, said shield adjacent each edge in the proximity of said body being provided with a plurality of slots for selectively receiving said little finger strap, said little finger strap together with a protrusion disposed in the palm of the hand serving to preclude rotation of said container relative to the hand and arm of the human being.

References Cited in the file of this patent

UNITED STATES PATENTS

| | | |
|---|---|---|
| 907,012 | Day | Dec. 15, 1908 |
| 1,505,487 | Park | Aug. 19, 1924 |
| 2,313,731 | Brogden | Mar. 16, 1943 |